US011972885B2

(12) United States Patent
Otake et al.

(10) Patent No.: US 11,972,885 B2
(45) **Date of Patent: *Apr. 30, 2024**

(54) MAGNETIC MATERIAL AND COIL COMPONENT

(75) Inventors: Kenji Otake, Takasaki (JP); Hitoshi Matsuura, Takasaki (JP)

(73) Assignee: TAIYO YUDEN CO., LTD, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/241,240

(22) PCT Filed: Jan. 5, 2012

(86) PCT No.: PCT/JP2012/050058
§ 371 (c)(1),
(2), (4) Date: Mar. 7, 2014

(87) PCT Pub. No.: WO2013/031243
PCT Pub. Date: Mar. 7, 2013

(65) Prior Publication Data

US 2014/0225703 A1 Aug. 14, 2014

(30) Foreign Application Priority Data

Aug. 26, 2011 (JP) ................................ 2011-184223

(51) Int. Cl.
*H01F 1/24* (2006.01)
*H01F 1/33* (2006.01)
(Continued)

(52) U.S. Cl.
CPC ................. *H01F 1/24* (2013.01); *H01F 1/33* (2013.01); *H01F 17/0033* (2013.01); *H01F 17/04* (2013.01); *H01F 2017/048* (2013.01)

(58) Field of Classification Search
CPC ........ B22F 2998/10; B22F 5/006; B22F 3/18; B22F 3/02; B22F 1/02; B22F 1/0003;
(Continued)

(56) References Cited

U.S. PATENT DOCUMENTS 2,193,768 A 3/1940 Masumoto et al.
4,129,444 A 12/1978 Dreyer et al.
(Continued)

FOREIGN PATENT DOCUMENTS

CN 1731542 A 2/2006
CN 101308719 A 11/2008
(Continued)

OTHER PUBLICATIONS

International Search Report mailed Apr. 10, 2012, issued for International application No. PCT/JP2012/050058.
(Continued)

*Primary Examiner* — Holly Rickman
*Assistant Examiner* — Lisa Chau
(74) *Attorney, Agent, or Firm* — Law Office of Katsuhiro Arai

(57) ABSTRACT

A magnetic material includes a grain compact in which metal grains having oxide films are compacted, wherein the metal grains are constituted by Fe—Si-M soft magnetic alloy (where M represents a metal element that oxidizes more easily than iron), the metal grains in the grain compact are mutually bonded with adjacent metal grains by inter-bonding of their oxide films, and at least some of this bonding of oxide films takes the form of bonding of crystalline oxides, or preferably at least some of the bonding of oxides is based on continuous lattice bond. A coil component has a coil on an interior or surface of an element body wherein the element body uses the magnetic material.

10 Claims, 3 Drawing Sheets

1: Grain compact 11: Metal grain
12: Oxide film 22: Inter-bonding of oxide films
30: Void

(51) Int. Cl.
*H01F 17/00* (2006.01)
*H01F 17/04* (2006.01)

(58) Field of Classification Search
CPC .... B22F 1/0059; B22F 1/0018; Y10T 428/32; Y10T 428/325; Y10T 428/269; Y10T 428/2991; Y10T 428/12181; Y10T 428/25; Y10T 428/26; Y10T 428/2949; Y10T 428/2998; Y10T 428/31504; Y10T 428/31544; H01F 2017/065; H01F 17/04; H01F 1/00; H01F 1/26; H01F 1/28; H01F 1/01; H01F 1/14766; H01F 1/153; H01F 1/15333; H01F 1/15375; H01F 1/24; H01F 1/33; H01F 27/365; H01F 41/0246; H01F 41/20; H01F 41/005; H01F 41/18; H01F 10/08
See application file for complete search history.

(56) References Cited

U.S. PATENT DOCUMENTS 4,921,763 A 5/1990 Karamon
5,238,507 A * 8/1993 Kugimiya .............. G11B 5/133 148/307
5,352,522 A * 10/1994 Kugimiya ................. B22F 1/02 419/35
5,522,946 A 6/1996 Tomita et al.
5,997,999 A 12/1999 Horiuchi et al.
6,051,324 A * 4/2000 Moorhead ................. H01F 1/24 428/403
6,392,525 B1 5/2002 Kato et al.
6,432,159 B1 8/2002 Saito et al.
6,515,568 B1 2/2003 Maki et al.
6,720,074 B2 * 4/2004 Zhang ................... B22F 1/0018 427/127
6,764,643 B2 7/2004 Sagawa et al.
6,784,782 B2 8/2004 Inoue et al.
6,814,928 B2 11/2004 Sagawa et al.
7,422,697 B2 9/2008 Takahashi et al.
7,446,638 B2 11/2008 Nogi
7,719,399 B2 5/2010 Iwasaki
7,843,701 B2 11/2010 Kudo et al.
8,018,313 B2 9/2011 Tada et al.
8,362,866 B2 1/2013 Matsuura et al.
8,416,051 B2 4/2013 Matsuura et al.
8,427,265 B2 4/2013 Hachiya et al.
8,525,630 B2 9/2013 Kobayashi et al.
8,610,525 B2 12/2013 Matsuura et al.
8,866,579 B2 10/2014 Hachiya et al.
8,896,405 B2 11/2014 Hachiya et al.
9,349,517 B2 5/2016 Matsuura et al.
9,892,834 B2 * 2/2018 Ogawa .................... H01F 1/408
2002/0043303 A1 * 4/2002 Takemoto ................. H01F 1/24 148/306
2003/0047245 A1 * 3/2003 Takemoto ........... H01F 41/0246 148/306
2004/0086412 A1 5/2004 Suzuki et al.
2004/0140016 A1 7/2004 Sakamoto et al.
2004/0209120 A1 10/2004 Inoue et al.
2005/0199852 A1 9/2005 Takenoshita
2007/0159282 A1 7/2007 Huang et al.
2007/0290161 A1 12/2007 Tokuoka et al.
2008/0003126 A1 1/2008 Watanabe et al.
2008/0012679 A1 1/2008 Okabe et al.
2008/0029300 A1 * 2/2008 Harada ..................... B22F 1/02 174/391
2008/0061264 A1 3/2008 Maeda et al.
2008/0152897 A1 6/2008 Maeda et al.
2008/0231409 A1 9/2008 Kugai et al.
2008/0278273 A1 11/2008 Lee et al.
2009/0003191 A1 1/2009 Inuzuka et al.
2009/0045905 A1 2/2009 Nakagawa et al.
2009/0102589 A1 4/2009 Lee et al.
2009/0140833 A1 6/2009 Tan et al.
2009/0184794 A1 7/2009 Tsuzuki et al.
2009/0302512 A1 12/2009 Gablenz et al.
2010/0033286 A1 2/2010 Katayama et al.
2010/0044618 A1 2/2010 Ishimine et al.
2010/0045120 A1 2/2010 Kitano et al.
2010/0253463 A1 10/2010 Shimomura et al.
2010/0287764 A1 11/2010 McGregor et al.
2010/0289609 A1 11/2010 Liao et al.
2011/0024670 A1 2/2011 Otsuki et al.
2011/0024671 A1 2/2011 Otsuki et al.
2011/0133881 A1 6/2011 Nakajima et al.
2011/0168939 A1 7/2011 Nakamura et al.
2011/0181384 A1 7/2011 Inuduka et al.
2011/0227690 A1 * 9/2011 Watanabe ............... C22C 38/00 336/221
2011/0267167 A1 11/2011 Ogawa et al.
2011/0285486 A1 11/2011 Maeda et al.
2011/0286143 A1 11/2011 Ikriannikov
2012/0001710 A1 1/2012 Wakabayashi et al.
2012/0038449 A1 2/2012 Ogawa et al.
2012/0070567 A1 3/2012 Watanabe et al.
2012/0229244 A1 9/2012 Ueno et al.
2013/0154786 A1 6/2013 Nakajima et al.
2013/0200970 A1 8/2013 Ogawa et al.
2013/0271256 A1 10/2013 Ueno et al.

FOREIGN PATENT DOCUMENTS

CN 101927344 A 12/2010
CN 102007549 A 4/2011
CN 102893346 A 1/2013
EP 0406580 A1 1/1991
JP H04-147903 A 5/1992
JP H04-346204 A 12/1992
JP H07-201570 A 8/1995
JP H09-074011 A 3/1997
JP H10-241942 A 9/1998
JP 2000-030925 A 1/2000
JP 2000-138120 A 5/2000
JP 2001-011563 A 1/2001
JP 2001-118725 A 4/2001
JP 2002-305108 A 10/2002
JP 2002-313620 A 10/2002
JP 2002-313672 A 10/2002
JP 2002-343618 A 11/2002
JP 2004-162174 A 6/2004
JP 2005-150257 A 6/2005
JP 2005-286145 A 10/2005
JP 2006179621 A 7/2006
JP 2007-019134 A 1/2007
JP 2007-027354 A 2/2007
JP 2007-123703 A 5/2007
JP 2007-258427 A 10/2007
JP 2007-299871 A 11/2007
JP 2008-028162 A 2/2008
JP 2008-041961 A 2/2008
JP 2008-195986 A 8/2008
JP 2009-010180 A 1/2009
JP 2009010180 A * 1/2009 ................ B22F 1/02
JP 2009-088496 A 4/2009
JP 2009-088502 A 4/2009
JP 2009088502 A * 4/2009
JP 2010-018823 A 1/2010
JP WO 2011001958 A1 * 1/2011 ............. C22C 38/00
JP 2011-249774 A 12/2011
TW 200845057 A 11/2008
TW M388724 U1 9/2010
WO 2009/001641 A1 12/2008
WO 2009/128425 A1 10/2009
WO 2009/128427 A1 10/2009
WO 2010/013843 A1 2/2010
WO 2010113681 A1 10/2010
WO 2011/001958 A1 1/2011
WO 2011001958 A1 1/2011

(56) References Cited

FOREIGN PATENT DOCUMENTS

| | | | | |
|---|---|---|---|---|
| WO | WO-2011001958 A1 * | 1/2011 | ............. | C22C 38/00 |
| WO | 2011136198 A1 | 11/2011 | | |

OTHER PUBLICATIONS

Notification of Transmittal of Translation of the International Preliminary Report on Patentability (PCT/IB/338) mailed Mar. 13, 2014, with International Preliminary Report on Patentability (PCT/IB/373) and Written Opinion of the International Searching Authority (PCT/ISA/237), for corresponding international application PCT/JP2012/050058.

A First Office Action issued by the State Intellectual Property Office of China on Nov. 3, 2017 for Chinese counterpart application No. 201610669659.5.

A Second Office Action issued by the State Intellectual Property Office of China on Jul. 3, 2018 for Chinese counterpart application No. 201610669659.5.

A Third Office Action issued by the State Intellectual Property Office of China on Mar. 1, 2019 for Chinese counterpart application No. 201610669659.5. (8 pages).

A Decision of Refusal issued by the State Intellectual Property Office of China on Sep. 30, 2019 for Chinese counterpart application No. 201610669659.5. (5 pages).

A Non-Final Rejection issued by U.S. Patent and Trademark Office, dated Dec. 14, 2016, for related U.S. Appl. No. 15/132,102.

* cited by examiner

[Fig. 1]
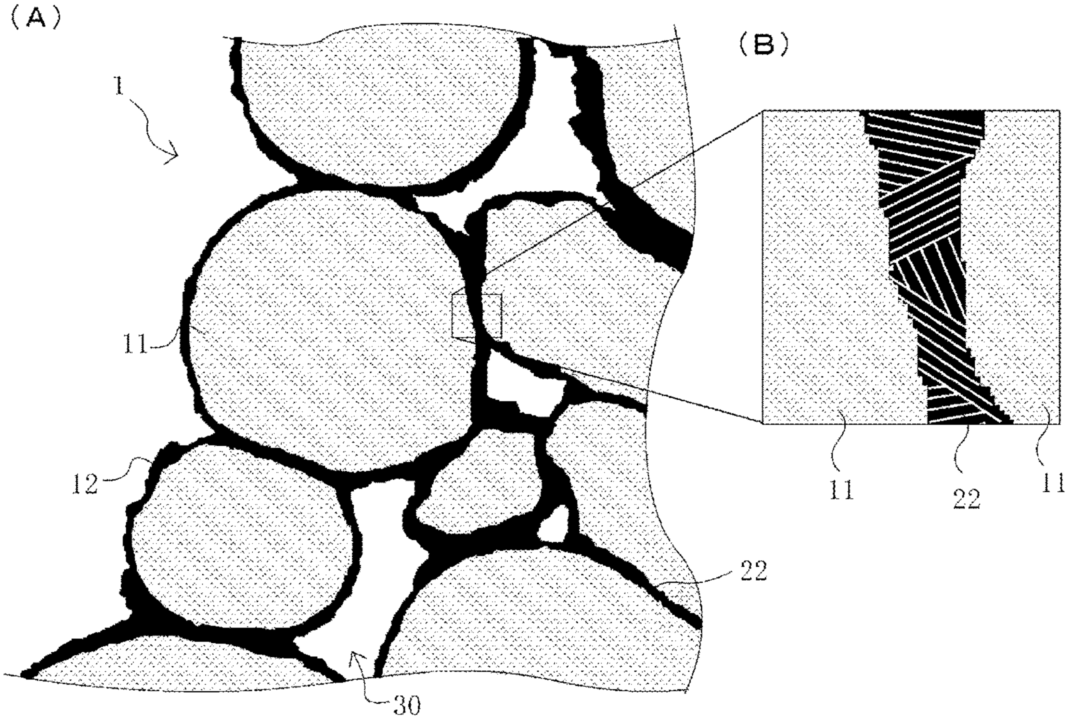
1: Grain compact
12: Oxide film
30: Void
11: Metal grain
22: Inter-bonding of oxide films
[Fig. 2]
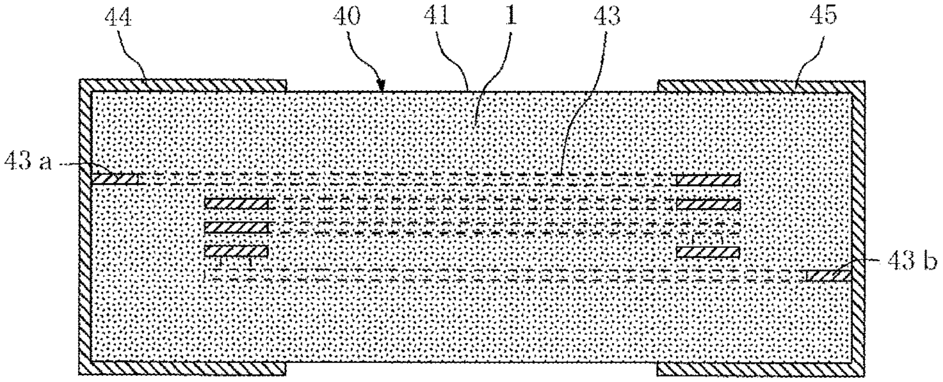

[Fig. 3]
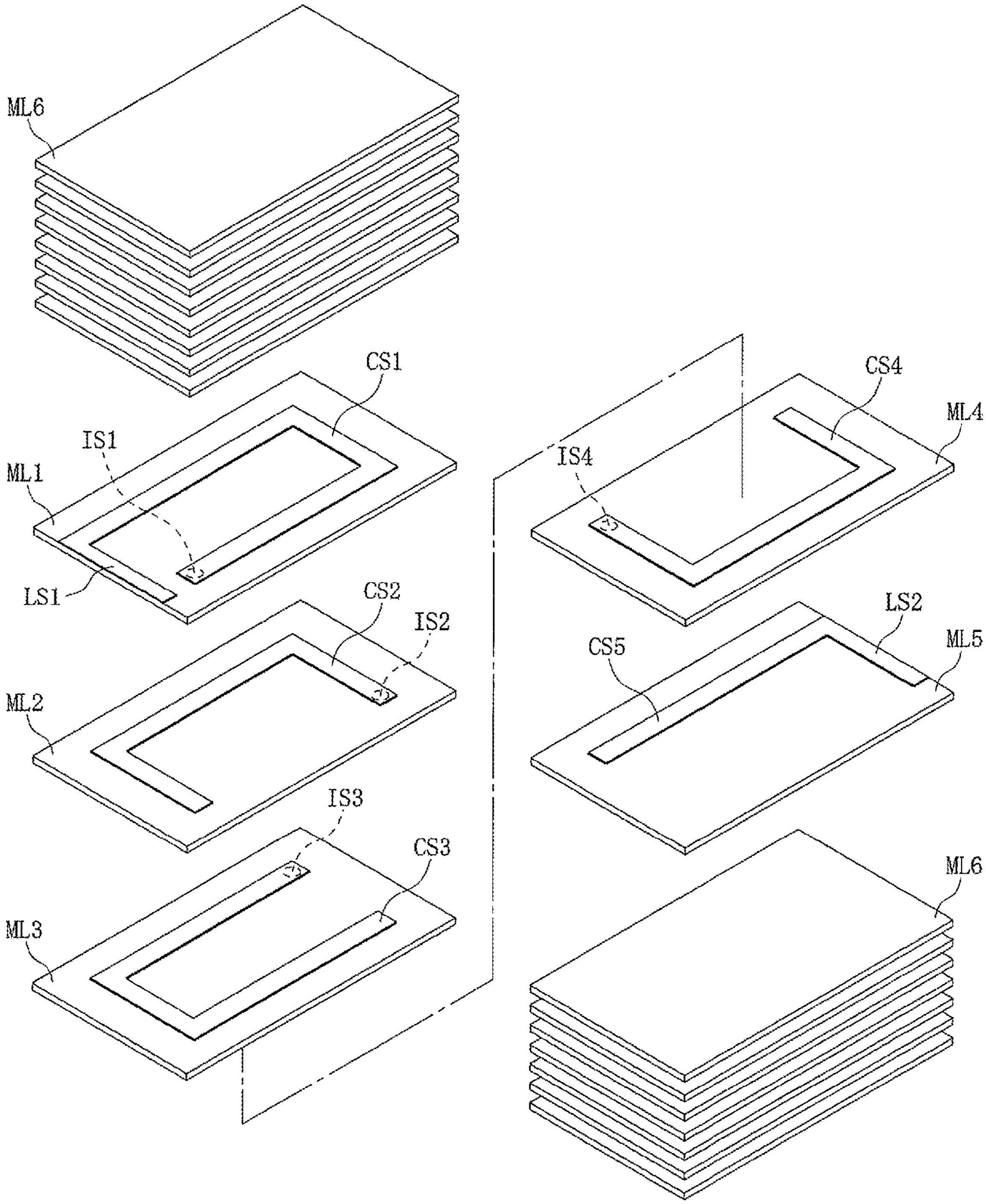

[Fig. 4]
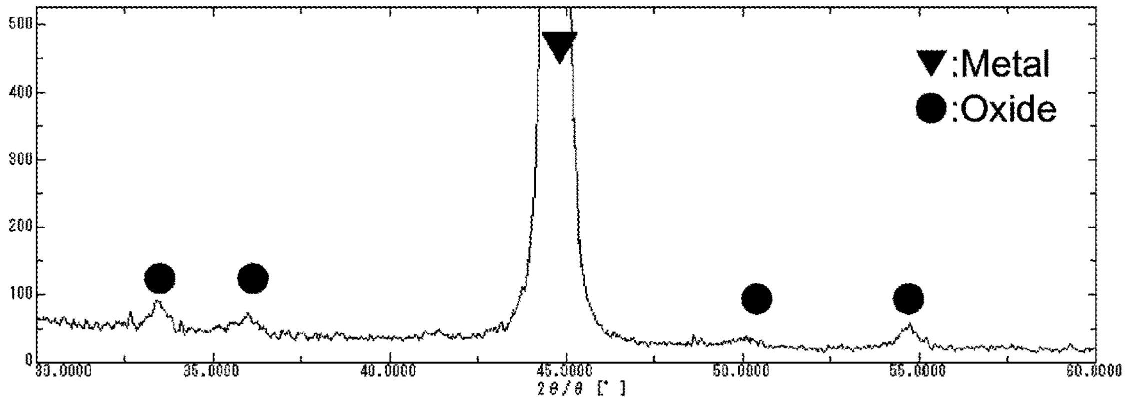

MAGNETIC MATERIAL AND COIL COMPONENT

This application is the U.S. National Phase under 35 U.S.C. § 371 of International Application PCT/JP2012/050058, filed Jan. 5, 2012, which claims priority to Japanese Patent Applications No. 2011-184223, filed Aug. 26, 2011. The International Application was published under PCT Article 21(2) in a language other than English.

TECHNICAL FIELD

The present invention relates to a magnetic material that can be used primarily as a core of coil inductor, etc., as well as a coil component using the same.

Coil components such as inductors, choke coils, and transformers (so-called inductance components) have a magnetic material and a coil formed inside or on the surface of the magnetic material. For the magnetic material, Ni—Cu—Zn ferrite or other type of ferrite is generally used.

Coil components of this type have been facing a demand for larger current (higher rated current) in recent years. To meet this demand, proposals have been made to replace the material of the magnetic body from ferrite as had been traditionally used, to Fe—Cr—Si alloy, Fe—Al—Si alloy or other soft magnetic alloy, where these proposed alloys are characterized by their higher saturated magnetic flux density compared to ferrite. On the other hand, their volume resistivity is significantly lower than that of ferrite.

Patent Literature 1 discloses a complex magnetic material using grains of Fe—Al—Si alloy with alumina film formed around them. Patent Literature 2 discloses a complex magnetic body that contains metal magnetic powder and thermosetting resin, with the metal magnetic powder present at a specific fill ratio.

PRIOR ART LITERATURES

Patent Literature

Patent Literature 1: Japanese Patent Laid-open No. 2001-11563

Patent Literature 2: Japanese Patent Laid-open No. 2002-305108

SUMMARY OF THE INVENTION

Problems to be Solved by the Invention

To expand the scope of application of magnetic materials using soft magnetic alloy, it is desired that compacts of soft magnetic alloy grains be made stronger. The object of the present invention is to provide a magnetic material comprising a compact of soft magnetic alloy grains and constituted in a manner achieving improved mechanical strength, as well as a coil component using such magnetic material.

Means for Solving the Problems

After studying in earnest, the inventors of the present invention completed the invention relating to a magnetic material, the details of which are described below.

The magnetic material proposed by the present invention comprises a grain compact produced by compacting metal grains having oxide film. The metal grains are constituted by Fe—Si—M soft magnetic alloy (where M represents a metal element that oxidizes more easily than iron). Metal grains in the grain compact are mutually bonded with adjacent metal grains by means of inter-bonding of their oxide films. At least some of this bonding of oxide films takes the form of bonding of crystalline oxides, and preferably at least some of this bonding of crystalline oxides is based on continuous lattice bond. In the meantime, preferably the aforementioned inter-bonding of oxide films is generated by means of heat treatment. According to another embodiment of the present invention, various types of coil components using the aforementioned magnetic material are provided.

Effects of the Invention

According to the present invention, metal grains are bonded together by means of bonding of crystalline oxides in the grain compact, so a magnetic material offering high strength can be obtained. In a favorable embodiment, the aforementioned bond has continuously lattice-bonded oxides, which improves the strength further.

BRIEF DESCRIPTION OF THE DRAWINGS

FIG. 1 FIG. 1(A) is a section view that schematically represents the fine structure of the magnetic material proposed by the present invention. FIG. 1(B) is a partially enlarged view of FIG. 1(A).

FIG. 2 This is a schematic section view of a laminated inductor as a coil component.

FIG. 3 This is a schematic exploded view of a laminated inductor.

FIG. 4 This is a powder X-ray diffraction pattern of a grain compact obtained in an example.

MODES FOR CARRYING OUT THE INVENTION

The present invention is described in detail by referring to the drawings as appropriate. It should be noted, however, that the present invention is not at all limited to the illustrated embodiments and that, because the characteristic parts of the invention may be emphasized in the drawings, the scale of each part of the drawings is not necessarily accurate.

According to the present invention, the magnetic material comprises a grain compact produced by compacting specific grains. Under the present invention, the magnetic material plays the role of a magnetic path in a coil inductor or other coil component, and typically takes the form of a core of a coil component, etc.

FIG. 1 is a section view that schematically represents the fine structure of the magnetic material proposed by the present invention. A grain compact 1 is microscopically understood as an aggregate of a large number of initially independent metal grains 11 that are now bonded together. Individual metal grains 11 have oxide film 12 formed roughly all around them, and this oxide film 12 ensures the insulation property of the grain compact 1. Adjacent metal grains 11 together constitute the grain compact 1 having a specific shape as a result of inter-bonding of oxide films 12 around the respective metal grains 11. Partially, inter-bonding of metal parts of adjacent metal grains 11 is permitted. With the magnetic materials traditionally used, independent magnetic grains or conjugates each comprising approximately several magnetic grains are dispersed in a matrix of hardened organic resin, or independent magnetic grains or conjugates each comprising approximately several magnetic grains are dispersed in a matrix of hardened glass component. Under the present invention, preferably no organic resin matrix or glass component matrix is virtually present in the grain compact 1.

The oxide film 12 formed roughly all around individual metal grains 11 may be formed in the material grain stage before the grain compact 1 is formed. Or, the oxide film may be generated in the compacting process using material grains in which oxide film is absent or minimal. Presence of oxide film 12 can be recognized as a contrast (brightness) difference on an image captured with a scanning electron microscope (SEM) at around 3000 magnifications. Presence of oxide film 12 assures the insulation property of the magnetic material as a whole.

In the grain compact 1, inter-bonding of grains is primarily based on inter-bonding 22 of oxide films 12. Presence of inter-bonding 22 of oxide films 12 can be clearly determined by, for example, visually recognizing on a SEM image, etc., taken at around 3000 magnifications that the oxide films 12 of adjacent metal grains 11 have the same phase. Presence of inter-bonding 22 of oxide films 12 improves the mechanical strength and insulation property.

According to the present invention, at least some of the many bonds 22 present in the grain compact 1 are based on crystalline oxides. Because not all inter-bonds 22 of oxide films 12 are amorphous, but crystalline oxides are also present, the inter-bonding of metal grains 11 becomes stronger and the strength of the grain compact 1 improves as a result.

That the inter-bonding 22 of oxide film 12 is that of oxides having crystallinity can be verified by, for example, obtaining an X-ray diffraction pattern of the grain compact 1 and then checking whether or not there is a diffraction peak of the applicable crystalline oxide.

According to a favorable embodiment of the present invention, at least some of the many bonds 22 present in the grain compact 1 are based on continuously lattice-bonded crystalline oxides. In FIG. 1(B), a continuous lattice bond constituting a bond 22 is emphasized. “Continuous lattice bond” means that, when the respective oxide films 12 of adjacent metal grains 11 form a bond 22, a crystal lattice is present from the edge of one metal grain 11 to the edge of the other metal grain 11 in the bond 22. In other words, when the respective oxide films 12 covering adjacent metal grains 11 form a bond 22 together, they do not join together in crystallographical terms only near the bonding point, but the oxide films 12 of the two metal grains 11 join together in crystallographical terms over a wider area to form the bond 22. This presence of continuous lattice bond allows for more effective improvement of the strength of the grain compact 1. Presence of continuous lattice bond can be confirmed by, for example, visually recognizing an integral stripe pattern in the bond 22 on a STEM bright-field image (taken at around 10000 magnifications), as schematically illustrated in FIG. 1(B).

According to the present invention, preferably the oxide films 12 of adjacent metal grains 11 are bonded together over the entire grain compact 1, but as long as they are bonded at least partially, considerable improvement in mechanical strength and insulation property can be achieved and this mode is also considered an embodiment of the present invention. Preferably inter-bonds 22 of oxide films 12 equal to or greater than the number of metal grains 11 contained in the grain compact 1 are present. Additionally, inter-bonds of metal grains 11 (not illustrated), which are not via inter-bonding of oxide films 12, may be present partially. Furthermore, a mode may be partially present where adjacent metal grains 11 are simply in contact with or in close proximity to each other physically, without inter-bonding of oxide films 12 or inter-bonding of metal grains 11.

Methods to generate inter-bonding 22 of oxide films 12 include, for example, applying heat treatment at a specified temperature as described later in an ambience where oxygen is present (such as in air), when the grain compact 1 is manufactured. Preferably, generating oxide film 12 through the heat treatment facilitates the formation by the oxide film 12 of a bond 22 having a continuous lattice bond. To be more specific, preferably oxide film 12 is formed as a result of oxidization, by the heat treatment, of the part that was metal in the material grain stage, as this facilitates the formation of a bond 22 having a continuous lattice bond.

According to the present invention, not only inter-bonding 22 of oxide films 12, but also inter-bonding of metal grains 11 (metal bonding) can be present in the grain compact 1. As is the case with the aforementioned inter-bonding 22 of oxide films 12, presence of metal bonding can be clearly determined by, for example, visually recognizing on a SEM image, etc., taken at around 3000 magnifications that the adjacent metal grains 11 have bonding points while maintaining the same phase. Presence of metal bonding improves the magnetic permeability further.

Methods to generate metal bonding include, for example, using grains with less oxide film as material grains, adjusting the temperature and partial oxygen pressure as described later during the heat treatment applied to manufacture the grain compact 1, and adjusting the compacting density when the grain compact 1 is obtained from the material grains.

The individual metal grains 11 are primarily constituted by specific soft magnetic alloy. Under the present invention, the metal grain 11 is constituted by Fe—Si—M soft magnetic alloy. Here, M is a metal element that oxidizes more easily than iron, and is typically chromium, aluminum, titanium, etc., and preferably chromium or aluminum. Particularly when chromium is used, the metal grain becomes relatively soft, which makes it possible to achieve a higher compacting density through deformation of grains. It also permits generation of many inter-bonds of oxide films.

The Si content in the Fe—Si—M soft magnetic alloy is preferably 0.5 to 7.0 percent by weight, or more preferably 2.0 to 5.0 percent by weight. A higher Si content is preferable in that it leads to high resistance and high magnetic permeability, while a lower Si content is associated with good compactibility.

If M above is chromium, the Cr content in the Fe—Si—M soft magnetic alloy is preferably 2.0 to 15 percent by weight, or more preferably 3.0 to 6.0 percent by weight. Presence of chromium lowers the magnetic characteristics before heat treatment that represent the physical properties of the material grain, but it suppresses excessive oxidization during heat treatment. This means that more Cr leads to a greater effect of raising the magnetic permeability through heat treatment, while lowering the specific resistance after heat treatment. The above preferable range is proposed in consideration of the foregoing.

If M above is aluminum, the Al content in the Fe—Si—M soft magnetic alloy is preferably 2.0 to 15 percent by weight, or more preferably 3.0 to 6.0 percent by weight. Presence of aluminum is preferable in that it leads to formation of a passive state to suppress excessive oxidization during heat treatment, while allowing for expression of strength and insulation resistance; on the other hand, however, less aluminum is preferable from the viewpoint of improving magnetic characteristics. The above preferable range is proposed in consideration of the foregoing. It should be noted that the preferable contents of each metal component in Fe—Si—M soft magnetic alloy as mentioned above assume that the total amount of all alloy component represents 100 percent by weight. In other words, oxide film composition is excluded in the calculations of preferable contents above.

Preferably the remainder of the Fe—Si—M soft magnetic alloy other than Si and metal M, except for unavoidable impurities, is iron. Metals that may be contained other than Fe, Si, and M include manganese, cobalt, nickel and copper.

The chemical composition of the alloy constituting each metal grain 11 in the grain compact 1 can be calculated, for example, by capturing a section of the grain compact 1 with a scanning electron microscope (SEM) and then analyzing the composition by energy dispersive X-ray spectroscopy (EDS) according to the ZAF method.

The size of each material grain is virtually equivalent to the size of the metal grain constituting the grain compact 1 in the magnetic material to be finally obtained. When the magnetic permeability and in-grain eddy current loss are considered, the size of the material grain based on d50 is preferably 2 to 30 μm, or more preferably 2 to 20 μm, or yet more preferably 3 to 13 μm. The d50 of the material grain can be measured using a laser diffraction/scattering measuring system.

The material grain is preferably a grain manufactured per the atomization method. As mentioned above, preferably the part that was metal in the material grain stage is oxidized through heat treatment when bonding 22 via oxide films 12 is formed in the grain compact 1. For this reason, it is better that oxide film is not present excessively in the material grain, although oxide film can be present. Means for reducing the oxide film in the material grain includes, among others, putting the material grain through heat treatment in a reducing ambience or through chemical or other treatment such as removing the surface oxide layer using acid.

For the aforementioned material grain, any known alloy grain manufacturing method may be adopted, or PF20-F by Epson Atmix, SFR-FeSiAl by Nippon Atomized Metal Powders or other commercial product may be used.

The method to obtain the compact from the material grain is not limited in any way, and any known means in the field of grain compact manufacturing can be incorporated as deemed appropriate. The following illustrates a typical manufacturing example based on a manufacturing method where the coil component is a laminated inductor. First, a doctor blade, die-coater, or other coating machine is used to coat the surface of a base film made of resin, etc., with a magnetic paste (slurry) prepared beforehand. The coated film is then dried with a hot-air dryer or other dryer to obtain a green sheet. The magnetic paste contains material grains 11 and, typically, polymer resin as a binder, and solvent.

Preferably the magnetic paste contains polymer resin as a binder. The type of polymer resin is not limited in any way and may be polyvinyl butyral (PVB) or other polyvinyl acetal resin, for example. The type of solvent in the magnetic paste is not limited in any way and butyl carbitol or other glycol ether can be used, for example. The blending ratio of soft magnetic alloy grains, polymer resin, solvent, etc., in the magnetic paste, among other conditions, can be adjusted as deemed appropriate, and the viscosity and other properties of the magnetic paste can also be set this way.

For the specific method to obtain a green sheet by coating and drying a magnetic paste, any prior art can be applied as deemed appropriate. The green sheet may be rolled, as well. Rolling can be done using a calendar roll, roll press, etc. Rolling is done by applying a load of 1800 kgf or more, or preferably 2000 kgf or more, or more preferably 2000 to 8000 kgf, for example, at a temperature of 60° C. or above, or preferably 60 to 90° C., for example.

Next, the green sheet is punched with a stamping machine, laser processing machine, or other punching machine to form through holes in a specific pattern. The pattern of through holes is set so that when multiple sheets, each prepared this way, are stacked on top of each other, a coil will be formed by the through holes filled with a conductor, and the conductor patterns. For the through hole patterns and conductor pattern shapes for forming a coil, any prior art can be applied as deemed appropriate, and a specific example is also explained in “Example” later by referring to the drawings.

Preferably a conductive paste is used to fill the through holes and print conductive patterns. The conductive paste contains conductive grains and, typically, polymer resin as a binder, and solvent.

For the conductive grains, silver grains, etc., can be used. The size of the conductive grain based on volume is such that preferably the d50 is 1 to 10 μm. The d50 of the conductive grain is measured with a grain size/granularity distribution measuring system applying the laser diffraction/scattering method (such as Microtrac by Nikkiso Co., Ltd., for example).

Preferably the conductive paste contains polymer resin as a binder. The type of polymer resin is not limited in any way and may be polyvinyl butyral (PVB) or other polyvinyl acetal resin, for example. The type of solvent in the conductive paste is not limited in any way and butyl carbitol or other glycol ether can be used, for example. The blending ratio of conductive grains, polymer resin, solvent, etc., in the conductive paste, among other conditions, can be adjusted as deemed appropriate, and the viscosity and other properties of the conductive paste can also be set this way.

Next, a screen printer, gravure printer, or other printing machine is used to print the conductive paste on the surface of each green sheet, after which the printed sheet is dried with a hot-air dryer or other dryer to form a conductive pattern corresponding to a coil. During printing, the aforementioned through hole is filled with some of the conductive paste. As a result, the conductive paste filling the through holes, and the printed conductive patterns will together constitute a coil shape.

Using a suction transfer machine and press, the printed green sheets are stacked on top of each other in a specified order and then thermally compressed to produce a laminate. Next, a dicer, laser processing machine, or other cutting machine is used to cut the laminate to the component body size to produce a chip before heat treatment.

A sintering furnace or other heating system is used to heat-treat the chip before heat treatment in an oxidizing ambience such as atmosphere. This heat treatment normally includes a binder removal process and oxide film forming process, where the binder removal process is implemented under the condition of heating for approx. 1 hour at a temperature around which the polymer resin used as the binder disappears, such as approx. 300° C., for example, while the oxide film forming process is implemented under the condition of approx. 750° C. for approx. 2 hours, for example.

In the chip before heat treatment, many fine gaps exist between individual metal grains 11, and normally these fine gaps are filled with a mixture of solvent and binder. The mixture disappears in the binder removal process, so once the binder removal process is completed, the fine gaps turn into pores. Also in the chip before heat treatment, many fine gaps also exist between conductive grains. These fine gaps are filled with a mixture of solvent and binder. This mixture also disappears in the binder removal process.

In the oxide film forming process following the binder removal process, the alloy grains 11 pack together closely to produce a grain compact 1 and, typically when this happens, the oxide films 12 on the surfaces of respective alloy grains 11 form bond 22 together, where at least some of these bonds 22 are constituted by crystalline oxides and preferably characterized by continuous lattice bonding. In this state, the conductive grains are sintered to form a coil. As a result, a laminated inductor is obtained.

Normally, external terminals are formed after the heat treatment. A dip coater, roller coater, or other coating machine is used to coat a conductive paste prepared beforehand on both longitudinal ends of the component body, and the coated component body is then baked using a sintering furnace or other heating system under the condition of approx. 600° C. for approx. 1 hour, for example, to form external terminals. For the conductive paste for external terminals, the aforementioned paste for printing conductive patterns or any similar paste can be used as deemed appropriate.

As another method for manufacturing a coil component using the magnetic material proposed by the present invention, a method whereby material grains are compacted under non-heating conditions and then put through heat treatment is explained.

When compacting the material grains under non-heating conditions, it is preferable to add organic resin as a binder. For the organic resin, it is preferable to use one constituted by acrylic resin, butyral resin, vinyl resin, or other resin whose thermal decomposition temperature is 500° C. or below, as less binder will remain after the heat treatment. Any known lubricant may be added at the time of compacting. The lubricant may be organic acid salt, etc., where specific examples include zinc stearate and calcium stearate. The amount of lubricant is preferably 0 to 1.5 parts by weight, or more preferably 0.1 to 1.0 parts by weight. When the amount of lubricant is zero, it means no lubricant is used. Material grains are agitated after adding a binder and/or lubricant as desired, and then the agitated material grains are compacted to a desired shape. Compacting is done by applying a pressure of 5 to 10 t/cm$^2$, for example. In this stage, it is highly likely that neither inter-bonding 22 of oxide films nor metal bonding is generated.

A favorable embodiment of heat treatment is explained. Preferably heat treatment is performed in an oxidizing ambience. To be more specific, the oxygen concentration is preferably 1% or more during heating, as it promotes the generation of both bonds 22 that interconnect oxide films and the metal bonding. Although the upper limit of oxygen concentration is not specified in particular, the oxygen concentration in air (approx. 21%) may be used, for example, in consideration of manufacturing cost, etc. The heating temperature is preferably 600° C. or above from the viewpoint of generating oxide film 12 constituted by crystalline oxide to facilitate the generation of inter-bonding 22 of oxide films 12 having continuous lattice bonds, but it is also preferably 900° C. or below from the viewpoint of suppressing oxidization to an appropriate level to maintain the presence of metal bonding and thereby raise the magnetic permeability. More preferably the heating temperature is 700 to 800° C. The heating time is preferably 0.5 hour or more from the viewpoint of facilitating the formation of continuous lattice bonding by the inter-bonding 22 of oxide films 12. The heating time is preferably 0.5 to 3 hours from the viewpoint of facilitating not only the generation of inter-bonding 22 of oxide films 12, but also that of metal bonding.

Voids 30 may be present in the obtained grain compact 1. Polymer resin (not illustrated) may be impregnated in at least some of the voids 30 present in the grain compact 1. Means for impregnating polymer resin include, for example, soaking the grain compact 1 in a liquid of polymer resin such as liquefied polymer resin or a solution of polymer resin and then lowering the pressure of the manufacturing system, or coating the aforementioned liquid of polymer resin on the grain compact 1 and letting it seep into the voids 30 near the surface. Impregnating polymer resin in the voids 30 of the grain compact 1 provides advantages such as higher strength and suppressed hygroscopic property. Examples of polymer resin include, but are not limited to, epoxy resin, fluororesin, and other organic resins, as well as silicone resin.

The magnetic material constituted by the grain compact 1 thus obtained can be used as a constituent of various types of electronic components. For example, the magnetic material proposed by the present invention may be used as a core and insulating-sheathed conductive wires are wound around it to form a coil component. In addition to the above, the magnetic material proposed by the present invention may be used as an element body and a coil is formed on the interior or surface of the element body to obtain various coil components. The aforementioned laminated inductor is also an embodiment of coil component. The coil component may be of surface mounting type, through-hole mounting type or any of the various mounting patterns, and for the means for obtaining the coil component from the magnetic material, including the means for constituting the coil component of any of these mounting patterns, any known manufacturing method in the field of electronic components can be incorporated as deemed appropriate.

The present invention is explained specifically below using examples. It should be noted, however, that the present invention is not at all limited to the embodiments described in these examples.

EXAMPLE

[Specific Structure of Coil Component]

An example of specific structure of the coil component manufactured in this example is explained. The coil component is approx. 3.2 mm long, approx. 1.6 mm wide, and approx. 0.8 mm high, and forms a rectangular solid shape as a whole. FIG. 2 is a schematic section view of the laminated inductor being the coil component. A coil component 40 has a component body 41 of rectangular solid shape, and a pair of external terminals 44, 45 provided on both longitudinal ends of the component body 41. The component body 41 has a magnetic material 1 constituted by a grain compact 1 of rectangular solid shape, and a spiral coil 43 covered with the magnetic material 1, where both ends of the coil 43 are connected to the two facing external terminals 44, 45, respectively.

FIG. 3 is a schematic exploded view of the laminated inductor. The magnetic material 1 has a structure of a total of 20 magnetic layers ML1 to ML6 joined together, and is approx. 3.2 mm long, approx. 1.6 mm wide, and approx. 0.8 mm high. The magnetic layers ML1 to ML6 are each approx. 3.2 mm long, approx. 1.6 mm wide, and approx. 40 μm thick. This magnetic material 1 is compacted primarily from Fe—Cr—Si alloy grains that are soft magnetic alloy grains. The magnetic material 1 does not contain either glass component or hardened resin. The composition of the Fe—

Cr—Si-alloy grain is 92 percent by weight of Fe, 4.5 percent by weight of Cr, and 3.5 percent by weight of Si. The d50, d10 and d90 of the Fe—Cr—Si alloy grain are 10 μm, 3 μm and 16 μm, respectively. The d10, d50 and d90 are parameters expressing the grain size distribution based on volume.

The coil 43 has a structure where a total of five coil segments CS1 to CS5 are spirally joined together with a total of four relay segments IS1 to IS4 connecting the coil segments CS1 to CS5, and is wound by approx. 3.5 times. This coil 43 is obtained primarily by heat-treating silver grains, where the volume-based size d50 of the silver grain used as the material is 5 μm.

The four coil segments CS1 to CS4 have a C shape, and the one coil segment CS5 has a band shape. The coil segments CS1 to CS5 each have a thickness of approx. 20 μm and width of approx. 0.2 mm. The top coil segment CS1 has, as a continuous part, an L-shaped leader part LS1 used to connect to the external terminal 44, while the bottom coil segment CS5 has, as a continuous part, an L-shaped leader part LS2 used to connect to the external terminal 45. The relay segments IS1 to IS4 each have a columnar shape penetrating the magnetic layers ML1 to ML4, and each has a bore of approx. 15 μm.

The external terminals 44, 45 each extend to each longitudinal end face of the component body 41 and the four side faces near the end face, and each has a thickness of approx. 20 μm. The one external terminal 44 connects to the edge of the leader part LS1 of the top coil segment CS1, while the other external terminal 45 connects to the edge of the leader part LS2 of the bottom coil segment CS5. These external terminals 44, 45 are obtained primarily by heat-treating silver grains whose volume-based size d50 is 5 μm.

[Manufacturing of Laminated Inductor]

A magnetic paste constituted by 85 percent by weight of the aforementioned Fe—Cr—Si alloy, 13 percent by weight of butyl carbitol (solvent), and 2 percent by weight of polyvinyl butyral (binder) was prepared. Using a doctor blade the magnetic paste was coated on the surface of a plastic base film, after which the coated film was dried with a hot-air dryer under the condition of approx. 80° C. for approx. 5 minutes. A green sheet was thus obtained on the base film. This base film and green sheet were rolled at approx. 70° C. under a load of 2000 kgf using a calendar roll. Thereafter, the green sheet was cut to obtain first through sixth sheets, respectively corresponding to the magnetic layers ML1 to ML6 (refer to FIG. 3) and having a size suitable for production of multiple work pieces at the same time.

Next, a punching machine was used to punch the first sheet corresponding to the magnetic layer ML1, and a through hole corresponding to the relay segment IS1 was formed according to a specific pattern. Similarly, through holes corresponding to the relay segments IS2 to IS4 were formed, according to specific patterns, in the second through fourth sheets corresponding to the magnetic layers ML2 to ML4.

Next, a printing machine was used to print on the surface of the first sheet a conductive paste constituted by 85 percent by weight of the aforementioned Ag grains, 13 percent by weight of butyl carbitol (solvent), and 2 percent by weight of polyvinyl butyral (binder), after which the printed sheet was dried with a hot-air dryer under the condition of approx. 80° C. for approx. 5 minutes, and then a first printed layer corresponding to the coil segment CS1 was produced according to a specific pattern. Similarly, second through fifth printed layers corresponding to the coil segments CS2 to CS5 were produced according to specific patterns on the surfaces of the second through fifth sheet, respectively.

Since the through holes formed in the first through fourth sheets are respectively positioned in a manner overlapping with the ends of the first through fourth printed layers, some of the conductive paste is filled in the through holes when the first through fourth printed layers are printed, to form first through fourth filled areas corresponding to the relay segments IS1 to IS4.

Next, a suction transfer machine and press were used to stack on top of each other and thermally compress in the order shown in FIG. 3 the first through fourth sheets each having a printed layer and filled area, the fifth sheet having only a printed layer, and the sixth sheet having neither printed layer nor filled area, to produce a laminate. This laminate was cut to the component body size using a cutting machine to obtain a chip-before-heat-treatment.

Next, a sintering furnace was used to heat-treat multiple chips-before-heat-treatment in an atmospheric ambience at once. First, they were heated under the condition of approx. 300° C. for approx. 1 hour as the binder removal process. Second, they were heated under the condition of approx. 750° C. for approx. 2 hours as the oxide film forming process. Because of this heat treatment, the soft magnetic alloy grains packed together closely and formed a grain compact 1, while the silver grains were sintered and formed a coil 43, and a component body 41 was obtained as a result.

Next, external terminals 44, 45 were formed. A conductive paste containing 85 percent by weight of the aforementioned silver grains, 13 percent by weight of butyl carbitol (solvent), and 2 percent by weight of polyvinyl butyral (binder) was coated using a coating machine on both longitudinal ends of the component body 41, after which the coated component body was sintered in a sintering furnace under the condition of approx. 600° C. for approx. 1 hour. As a result, the solvent and binder disappeared and the silver grains were sintered to form external terminals 44, 45, and consequently a coil component was obtained.

A SEM (3000 magnifications) was used to confirm the presence of inter-bonding of oxide films in the grain compact of the obtained coil component, and a STEM bright-field image was obtained at 10000 magnifications to confirm the presence of continuous lattice bonds. A powder X-ray diffraction pattern of the grain compact of this coil component was obtained. FIG. 4 shows the powder X-ray diffraction pattern obtained. Peaks arising from the oxide and having a 2θ of approx. 33°, approx. 36°, approx. 50° and approx. 55°, respectively, were confirmed. The grain compact was also measured for strength. The strength measurement method and measured result are described below. The obtained laminated inductor was measured for 3-point bending rupture stress as its device strength. Loads were applied in the height direction to the measurement target having a height dimension of h and depth dimension of b, to measure the load W that would cause the measurement target to rupture. Considering the bending moment M and geometrical moment of inertia I, the 3-point bending rupture stress σb was calculated from the equation provided below. L represents the distance between the two fulcrums supporting the measurement object on the opposite side of the plane to which the load is applied. $\sigma b=(M/I)\times(h/2)=3WL/2bh^2$. The strength before heat treatment was 14 kgf/mm$^2$, while the strength after heat treatment was 24 kgf/mm$^2$.

Description of the Symbols

1: Grain compact, 11: Metal grain, 12: Oxide film, 22: Inter-bonding of oxide films, 30: Void, 40: Coil component, 41: Component body, 43: Coil, 44, 45: External terminal

What is claimed is:

1. A magnetic material comprising a sintered grain compact in which metal grains provided, respectively, with oxide films are compacted, wherein:

the metal grains are constituted by Fe—Si-M soft magnetic alloy where M represents a metal element that oxidizes more easily than iron, and a size of the metal grains based on d50 is 2 to 30 μm, all the metal grains in the sintered grain compact are mutually bonded wherein each metal grain is inter-bonded with at least one adjacent metal grain at at least a single bonding area, wherein all single bonding areas include inter-bonding of the oxide films having uneven thickness of the oxide films between the inter-bonded respective metal grains, wherein some of the single bonding areas further include inter-bonding of metal grains via metal bonding in addition to the inter-bonding of the oxide films, and internal voids are present between the inter-bonded respective metal grains, wherein all surfaces of the metal grains in the sintered grain compact exposed to the internal voids are covered with the oxide films in their entirety, and at least some of the inter-bonding of oxide films takes a form of bonding of crystalline oxides, said oxide films consisting of elements corresponding to those obtained as a result of oxidation of the metal grains.

2. The magnetic material according to claim 1, wherein at least some of the bonding of crystalline oxides has continuous lattice bonds present from an edge of one of the adjacent metal grains to an edge of the other of said adjacent metal grains at a position where the adjacent metal grains face each other.

3. The magnetic material according to claim 2, wherein the inter-bonding of oxide films is generated by heat treatment.

4. The magnetic material according to claim 1, wherein the inter-bonding of oxide films is generated by heat treatment.

5. A coil component having a coil on an interior or surface of an element body, wherein the element body uses the magnetic material of claim 1.

6. The coil component according to claim 5, wherein at least some of the bonding of crystalline oxides is based on continuous lattice bonds.

7. The coil component according to claim 6, wherein the inter-bonding of oxide films is generated by heat treatment.

8. The coil component according to claim 5, wherein the inter-bonding of oxide films is generated by heat treatment.

9. The coil component according to claim 5, wherein some of the internal voids are connected to a surface of the sintered grain compact.

10. The magnetic material according to claim 1, wherein at least some of the internal voids are inter-connected to a surface of the sintered grain compact.

* * * * *